2,792,509

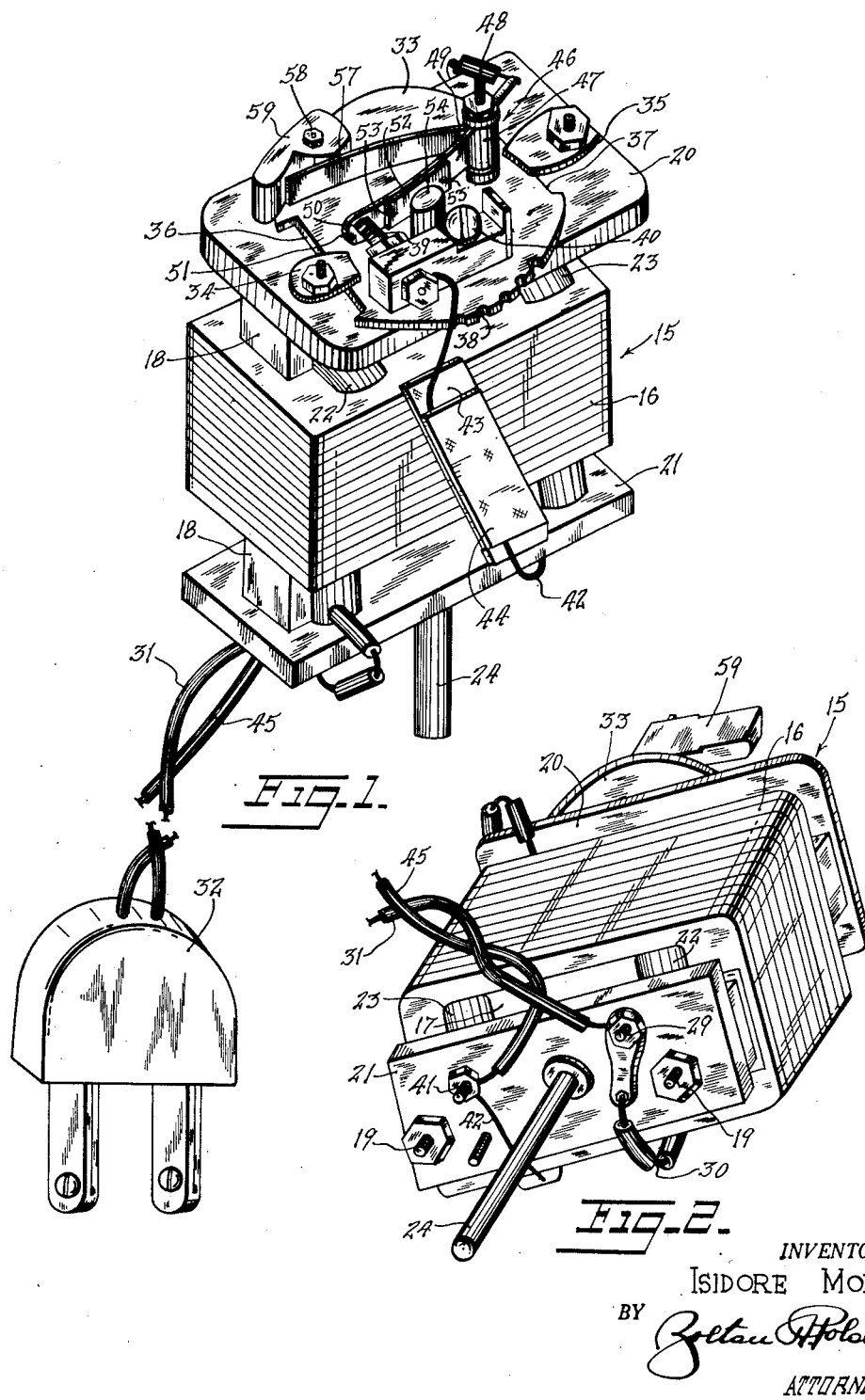

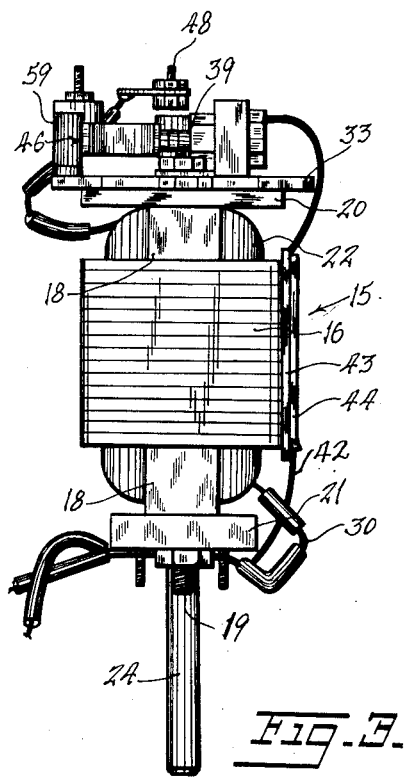

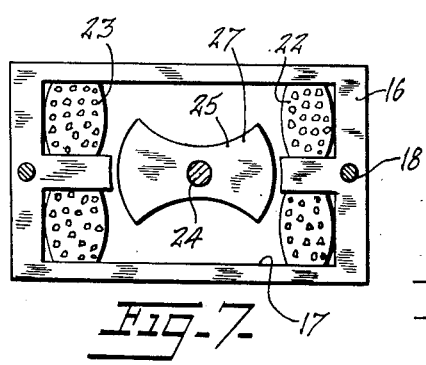
Fig. 7.
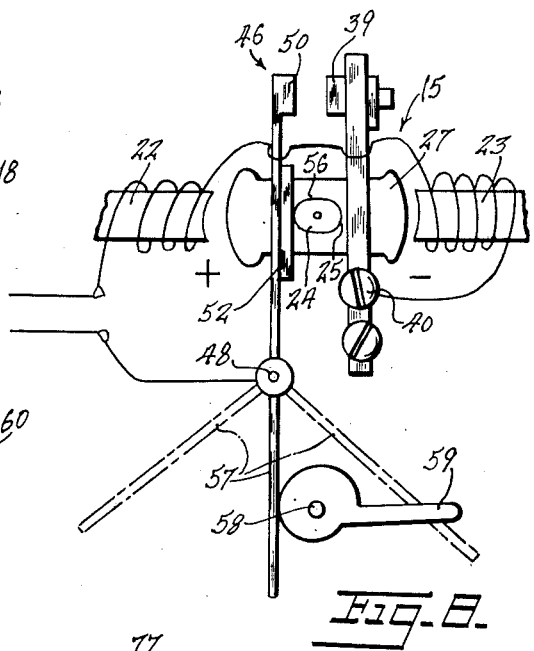
Fig. 8.
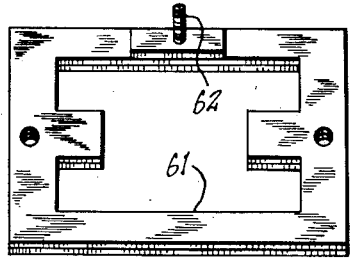
Fig. 9.
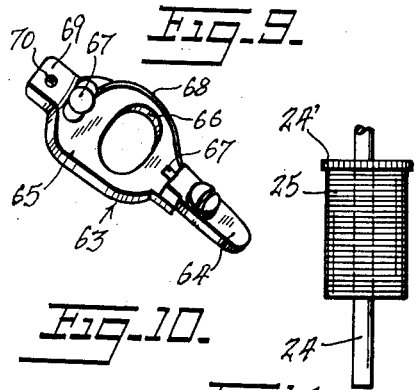
Fig. 10.
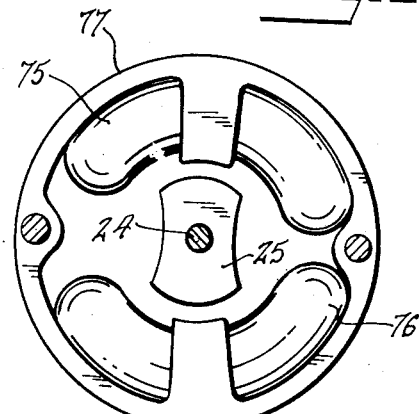
Fig. 11.
Fig. 14.
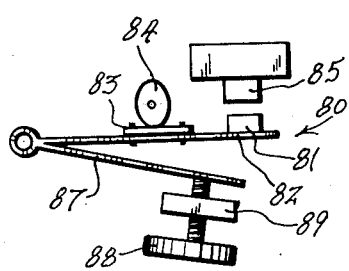
Fig. 12.
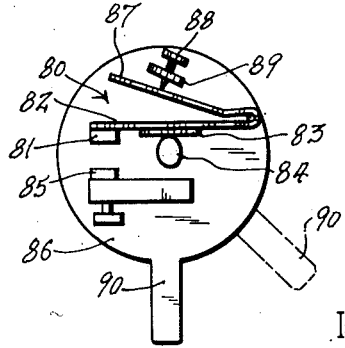
Fig. 13.
INVENTOR.
ISIDORE MORSE
BY
ATTORNEY United States Patent Office 2,792,509
Patented May 14, 1957

MAGNETIC TYPE ELECTRIC MOTOR

Isidore Morse, New York, N. Y.

Application September 2, 1955, Serial No. 532,224

7 Claims. (Cl. 310—46)

This invention relates to new and useful improvements in magnetic type electric motors.

More particularly, the present invention proposes the construction of an improved intermittent current electric motor of the A. C., D. C. and/or battery type having speed regulating means, which has a nonmagnetic periphery, and which will not lose speed when pressure or load is applied.

As a further object, the present invention proposes forming a motor with a movable top platform which when shifted in one direction will cause the motor to run forward and when shifted in another direction will cause the motor to reverse its direction of shaft rotation.

Another object of the invention proposes constructing the motor with an easily operated speed regulator conveniently mounted on the platform for adjusting the speed of the motor.

Another object is to provide a novel rotor and lever combination for starting the motor.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top perspective view of a motor constructed and arranged in accordance with the present invention, with a plug attached thereto.

Fig. 2 is a view similar to Fig. 1 but showing the bottom and other side of the motor.

Fig. 3 is an end elevational view of the motor.

Fig. 4 is a side elevational view of the motor.

Fig. 5 is a top plan view of the motor with the stationary and movable contacts closed.

Fig. 6 is a top plan view of the motor with the stationary and movable contacts open.

Fig. 7 is a sectional view taken on line 7—7 of Fig. 4.

Fig. 8 is a schematic wiring diagram of the motor.

Fig. 9 is a perspective view of a modified form of plate for the motor.

Fig. 10 is a perspective view of a shifter lever for the motor.

Fig. 11 is a view similar to Fig. 7 but illustrating a modification.

Fig. 12 is a fragmentary view illustrating another modification of the invention.

Fig. 13 is a view similar to Fig. 12 but showing a movable table equipped with a shifting handle.

Fig. 14 is a side elevational view of the rotor.

A magnetic type electric motor made in accordance with the first form of the invention and shown in Figs. 1 to 10 inclusive, is designated generally by the reference numeral 15.

Motor 15 has a stator core formed by plurality of thin superposed iron plates or laminations 16 having aligned central openings 17 and held together by spaced posts 18 connected by screws 19 to a top insulating plate 20 and a bottom insulating plate 21.

A pair of spaced coils 22 and 23 are vertically disposed between the top and bottom insulated plates 20 and 21 and extend through the openings 17 of the superposed plates 16.

Rotatably mounted between and extending through the insulated plates 20 and 21 and through the central openings 17 of the plates 16, there is a rotor including a shaft 24 and a core formed by a plurality of superposed iron plates 25 secured on the shaft. The shaft is mounted in bearings 26 and 27. The rotor is positioned for rotation between the spaced coils 22 and 23. A toothed wheel 24' is fixed on shaft 24 above the plates 25.

The coils 22 and 23 are connected at one end by a conductor 28. A terminal screw 29 is mounted on the lower insulating plate 21 and a conductor 30 connects this terminal with coil 22. The terminal 29 is also connected by a conductor 31 with an electric socket plug 32.

Mounted pivotally on the top shaft 24 on top of insulating plate 20 is a platform 33. Spaced hold-down clamps 34 and 35 are pivotally mounted on the top insulating plate 20 adjacent the periphery of the platform 33 to extend over the platform and frictionally hold it in any position to which it is pivoted. Spaced cutouts 36 and 37 are provided for the hold-down clamps in the platform. Finger gripping notches 38 are also provided in the periphery of the platform at one side thereof for turning the same.

Mounted on the platform 33 is a switch including a fixed contact 39 and a screw 40 provides means to adjust this fixed contact. Mounted on the bottom insulating plate 21 is a second terminal screw 41 and a conductor 42 connects this screw 41 with the fixed contact 39, insulating sheets 43 and 44 covering the conductor 42 where it crosses the thin parallel plates 16. The second terminal screw 41 is also connected with plug 32 by a conductor 45.

A movable contact 46 is mounted on platform 33. Contact 46 is a substantially V-shaped leaf spring of conducting material having its crook 47 encircling a conductor post 48 fixed to the platform 33. Spring 46 has a contact arm 49 with a contact tip 50 at its free end 51. An insulating bearing plate 52 is secured to the contact arm 49 by rivets 53 between the crook 47 and free end 51.

Shaft 24 has an elliptical-shaped upper end forming a contact operating cam 54 with its major axis 55 adapted to strike the bearing plate 52 and separate the movable and fixed contacts 46 and 39, respectively, as indicated in Fig. 6 to open the switch, and its minor axis 56 permits the arm 49 of the leaf spring 46 to bias the movable contact tip 50 against the fixed contact 39 as shown in Figs. 1 and 5.

The movable contact has another spring arm 57 and means for moving this arm comprises a bearing post 58 secured to the platform 33 adjacent said arm. An adjusting lever 59 is pivotally secured to the bearing post to move arm 57 toward the contact arm 49 to adjust the tension of the leaf spring movable contact 46.

A modified form of motor plate 60 is shown in Fig. 9. Plate 60 has a central opening 61 with a pivot pin 62 adjacent the central opening 61. A shifter plate or lever 63 is shown in Fig. 10 for coaction with plate 60. Shifter plate 63 has a handle 64 at one end and a body 65, the body having a central opening 66 with contacts 67 on the body at both ends thereof. A conductor 68 connects the contacts. Body 65 also has a downwardly extending lug portion 69 at its other end with a pin opening 70 for pivotally mounting the shifter plate 63. By swinging the plate 63 on the pivot pin 62, the position of the contacts thereon is changed relative to the cam 54 whereby the timing of energization of the coils is changed.

The plate 63 is adapted to engage the toothed wheel 24' on the rotor and turn the same for starting the motor upon manual turning of the plate by means of the handle 64.

The modification of the invention shown in Fig. 11 is characterized by the provision of a pair of coils 75 and 76 with an annular shaped ring 77 and a rotor 78 and shaft 79.

The modification of the invention illustrated in Figs. 12 and 13 is characterized by the provision of a V-shaped leaf spring type switch member 80 having a contact tip 81 on its contact arm 82 and an insulated bearing plate 83 on said arm for shaft operated cam 84 to bear against to separate the contact tip 81 from a fixed contact 85 mounted on a pivotable platform 86 and open the switch. The other arm 87 of the movable contact member 80 abuts a tension screw 88 mounted in a fixed post 89 on the platform 86. Tightening the screw increases the tension on the switch member 80 making the motor run faster. Platform 86 has a handle 90 which when moved to the dotted position of Fig. 13 reverses the motor.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A magnetic type electric motor comprising a plurality of thin superposed metal plates having aligned central openings, an insulating top plate and an insulating bottom plate connected with and spaced from the superposed plates, a pair of spaced coils vertically disposed between the top and bottom insulating plates and extending through the central openings of the superposed plates, a shaft rotatably mounted between and extending through the insulating plates and through the central openings of the superposed plates, metal rotor plates mounted on the shaft and disposed in the central openings of the superposed plates, a conductor connecting the coils at one end, conductor means connecting one of the coils at one end to one line of a source of electric current, a platform movably mounted on the top insulating plate, a fixed contact mounted on the platform, conductor means connecting the fixed contact with the other line of a source of electric current, a movable contact movably mounted on the platform with a conductor connecting said movable contact with one of said coils, means to move said movable contact to and from the fixed contact on rotation of the shaft, said platform being pivotally mounted on the shaft over the top insulating plate, and a pair of spaced holding clamps pivotally mounted on the top insulating plate adjacent the periphery of the table to extend over the table and frictionally to hold the table in any position to which it is pivoted.

2. A magnetic type electric motor comprising a plurality of thin superposed metal plates having aligned central openings, an insulating top plate and an insulating bottom plate connected with and spaced from the superposed plates, a pair of spaced coils vertically disposed between the top and bottom insulating plates and extending through the central openings of the superposed plates, a shaft rotatably mounted between and extending through the insulating plates and through the central openings of the superposed plates, metal rotor plates mounted on the shaft and disposed in the central openings of the superposed plates, a conductor connecting the coils at one end, conductor means connecting one of the coils at one end to one line of a source of electric current, a platform movably mounted on the top insulating plate, a fixed contact mounted on the platform, conductor means connecting the fixed contact with the other line of a source of electric current, a movable contact movably mounted on the platform with a conductor connecting said movable contact with one of said coils, means to move said movable contact to and from the fixed contact on rotation of the shaft, said platform being pivotally mounted on the top insulating plate aligned with said plate, and a pair of spaced holding clamps pivotally mounted on the top insulating plate adjacent the periphery of the platform to extend over the platform and frictionally to hold the platform in any position to which it is pivoted, said platform having peripheral finger notches at one side for pivoting.

3. A magnetic type electric motor comprising a plurality of superposed metal plates having aligned central openings, an insulating top plate and an insulating bottom plate connected with and spaced from the superposed plates, a pair of spaced coils vertically disposed between the top and bottom insulating plates and extending through the central openings of the superposed plates, a shaft rotatably mounted between and extending through the insulating plates and through the central openings of the superposed plates, metal rotor plates mounted on the shaft and disposed in the central openings of the superposed plates, a conductor connecting the coils at one end, conductor means connecting one of the coils at one end to one line of a source of electric current, a platform movably mounted on the top insulating plate, a fixed contact mounted on the platform, conductor means connecting the fixed contact with the other line of a source of electric current, a movable contact movably mounted on the platform with a conductor connecting said movable contact with one of said coils, means to move said movable contact to and from the fixed contact on rotation of the shaft, said platform being pivotally mounted on the top insulating plate in alignment with said plate, and a pair of spaced holding clamps movably mounted on the top insulating plate adjacent the periphery of the platform to extend over the platform and frictionally to hold the platform in any position to which it is pivoted, said platform having peripheral means at one sides for pivoting, said contacts being arranged on said platform to change the direction of rotation of the shaft by pivoting the platform.

4. A magnetic type electric motor comprising a plurality of thin superposed metal plates having aligned central openings, an insulating top plate and an insulating bottom plate connected with and spaced from the superposed plates, a pair of spaced coils vertically disposed between the top and bottom insulating plates and extending through the central openings of the superposed plates, a shaft rotatably mounted between and extending through the insulating plates and through the central openings of the superposed plates, metal rotor plates mounted on the shaft and disposed in the central openings of the superposed plates, a conductor connecting the coils at one end, conductor means connecting one of the coils at one end to one line of a source of electric current, a platform movably mounted on the top insulating plate, a fixed contact mounted on the platform, conductor means connecting the fixed contact with the other line of a source of electric current, a movable contact movably mounted on the platform with a conductor connecting said movable contact with one of said coils, means to move said movable contact to and from the fixed contact on rotation of the shaft, said movable contact being a V-shaped leaf spring of conducting material, a conductor post on the table, said leaf spring being secured at its crook to the conductor post and having a contact arm with a contact tip at the free end, said means to move the movable contact to and from the fixed contact on rotation of the shaft being an insulated bearing plate mounted on the contact arm of the leaf spring between its crook and the free end and said shaft having an upper end with an elliptical cross section having a major axis adapted to strike the bearing plate and separate the movable and fixed contacts and its minor axis permitting the leaf spring to bias the movable contact tip against the fixed contact.

5. A magnetic type electric motor comprising a plurality of thin superposed metal plates having aligned central openings, an insulating top plate and an insulating bottom plate connected with and spaced from the superposed plates, a pair of spaced coils vertically disposed between the top and bottom insulating plates and extending through the central openings of the superposed plates, a shaft rotatably mounted between and extending through the insulating plates and through the central openings of said plates, metal rotor plates mounted on the shaft and disposed in the central openings of the superposed plates, a conductor connecting the coils at one end, conductor means connecting one of the coils at one end to one line of a source of electric current, a platform movably mounted on the top insulating plate, a fixed contact mounted on the platform, conductor means connecting the fixed contact with the other line of a source of electric current, a movable contact movably mounted on the platform with a conductor connecting said movable contact with one of said coils, means to move said movable contact to and from the fixed contact on rotation of the shaft, said movable contact being a V-shaped leaf spring of conducting material, a conductor post on the platform, said leaf spring being secured at the crook to the conductor post and having a contact arm with a contact tip at the free end, said means to move the movable contact to and from the fixed contact on rotation of the shaft being an insulating bearing plate mounted on the contact arm of the leaf spring between the crook and the free end and said shaft having an upper end with an elliptical cross section having a major axis adapted to strike the bearing plate and separate the movable and fixed contacts, and its minor axis permitting the leaf spring to bias the movable contact tip against the fixed contact, a bearing block secured to the platform adjacent the movable contact, and movable adjusting means mounted on the bearing block to bear against and move the other arm of the leaf spring to and from the contact arm to adjust the tension of the spring.

6. A magnetic type electric motor comprising a plurality of thin superposed metal plates having aligned central openings, an insulating top plate and an insulating bottom plate connected with and spaced from the superposed plates, a pair of spaced coils vertically disposed between the top and bottom insulating plates and extending through the central openings of the superposed plates, a shaft rotatably mounted between and extending through the insulating plates and through the central openings of the superposed plates, metal rotor plates mounted on the shaft and disposed in the central openings of the superposed plates, a conductor connecting the coils at one end, conductor means connecting one of the coils at one end to one line of a source of electric current, a platform movably mounted on the top insulating plate, a fixed contact mounted on the platform, conductor means connecting the fixed contact with the other line of a source of electric current, a movable contact movably mounted on the platform with a conductor connecting said movable contact with one of said coils, means to move said movable contact to and from the fixed contact on rotation of the shaft, said movable contact being a V-shaped leaf spring of conductor material, a conductor post on the table, said leaf spring being secured at the crook to the conductor post and having a contact arm with a contact tip at the free end, said means to move the movable contact to and from the fixed contact on rotation of the shaft being an insulating bearing plate mounted on the contact arm of the leaf spring between the crook and the free end and said shaft having an upper end with an ellipitcal cross section having a major axis adapted to strike the bearing plate and separate the movable and fixed contacts and its minor axis permitting the leaf spring to bias the movable contact tip against the fixed contact, a bearing block secured to the platform adjacent the movable contact, and movable adjusting means mounted on the bearing block to bear against and move the other arm of the leaf spring to and from the contact arm to adjust the tension of the spring, said adjusting means being a screw.

7. A magnetic type electric motor comprising a plurality of thin superposed metal plates having aligned central openings, an insulating top plate and an insulating bottom plate connected with and spaced from the superposed plates, a pair of spaced coils vertically disposed between the top and bottom insulating plates and extending through the central openings of the superposed plates, a shaft rotatably mounted between and extending through the insulating plates and through the central openings of the superposed plates, metal rotor plates mounted on the shaft and disposed in the central openings of the superposed plates, a conductor connecting the coils at one end, conducting means connecting one of the coils at one end to one line of a source of electric current, a platform movably mounted on the top insulating plate, a fixed contact mounted on the platform, conducting means connecting the fixed contact with the other line of a source of electric current, a movable contact movably mounted on the platform with a conductor connecting said movable contact with one of said coils, means to move said movable contact to and from the fixed contact on rotation of the shaft, said movable contact being a V-shaped leaf spring of conducting material, a conductor post on the platform, said leaf spring being secured at the crook to the conductor post and having a contact arm with a contact tip at the free end, said means to move the movable contact to and from the fixed contact on rotation of the shaft being an insulated bearing plate mounted on the contact arm of the leaf spring between the crook and the free end and said shaft having an upper end with an elliptical cross section having a major axis adapted to strike the bearing plate and separate the movable and fixed contacts and its minor axis permitting the leaf spring to bias the movable contact tip against the fixed contact, a bearing block secured to the platform adjacent the movable contact, and movable adjusting means mounted on the bearing block to bear against and move the other arm of the leaf spring to and from the contact arm to adjust the tension of the spring, said adjusting means being a lever.

References Cited in the file of this patent

UNITED STATES PATENTS

| | | |
|---|---|---|
| 1,496,567 | Tomlinson | June 3, 1924 |
| 1,692,761 | Osser | Nov. 20, 1928 |
| 1,822,859 | Perkins | Sept. 8, 1931 |
| 1,828,895 | Hanley | Oct. 27, 1931 |
| 1,928,872 | Sherwin | Oct. 3, 1933 |
| 2,374,998 | Hitchcock | May 1, 1945 |